(12) United States Patent
Krawczyk

(10) Patent No.: US 6,199,988 B1
(45) Date of Patent: Mar. 13, 2001

(54) RETRACTABLE DEVICE, OF THE LIGHT SHIELD TYPE, FOR AN OPTICAL INSTRUMENT SUCH AS A SPACE TELESCOPE

(75) Inventor: Rodolphe André Krawczyk, Villeneuve-Loubet (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/276,492

(22) Filed: Mar. 25, 1999

(30) Foreign Application Priority Data

Mar. 26, 1998 (FR) .................................... 98 03748

(51) Int. Cl.⁷ .................................................. G02B 27/00
(52) U.S. Cl. ......................... 359/601; 359/604; 359/605; 359/609; 343/840
(58) Field of Search ..................... 359/601, 604, 359/605, 609, 610, 612; 343/840, 912, 915

(56) References Cited

U.S. PATENT DOCUMENTS

| | | | |
|---|---|---|---|
| 3,558,219 | 1/1971 | Buckingham et al. | 343/915 |
| 3,791,713 | 2/1974 | Mackay | 359/60 |
| 3,978,490 | 8/1976 | Fletcher et al. | 343/882 |
| 4,608,571 | 8/1986 | Luly | 343/781 P |
| 4,642,652 | 2/1987 | Herbig et al. | 343/915 |
| 4,780,726 | * 10/1988 | Archer et al. | 343/881 |
| 5,198,832 | * 3/1993 | Higgins et al. | 343/915 |
| 5,954,386 | * 9/1999 | Thomas | 296/97.2 |

* cited by examiner

*Primary Examiner*—Mohammad Y. Sikder
(74) *Attorney, Agent, or Firm*—Oblon, Spivak, McClelland, Maier & Neustadt, P.C.

(57) ABSTRACT

A retractable device (20), of a light shield type, is mounted on an optical instrument (10), such as a space telescope. The device comprises rods (22, 24) articulated about the optical instrument (10), within planes containing its axis (12), and a flexible and opaque covering (26), carried by these rods (22, 24). Motor units such as torsion springs integrated into the articulation devices (28, 30) of the rods allow the device (20) to be changed from a retracted configuration into an active configuration.

13 Claims, 5 Drawing Sheets

RETRACTABLE DEVICE, OF THE LIGHT SHIELD TYPE, FOR AN OPTICAL INSTRUMENT SUCH AS A SPACE TELESCOPE

DESCRIPTION

TECHNOLOGICAL FIELD

The invention relates to a retractable device of the light shield type, designed to prevent the entry of parasitic light, coming from the sun or from any other light source, into an optical instrument such as a telescope, when this device is in an active configuration.

The device according to the invention finds a specially important application in the domain of space. In effect, when it is in its retracted configuration, its reduced volume is particularly suited to the compactness restrictions imposed at the time of a launch. On the other hand, its active configuration allows it to be operational when the space vehicle is on station.

STATE OF THE TECHNOLOGY

When an optical instrument must be fitted with a light shield, the most commonly used technique consists of using a rigid light shield integral with the instrument or attached onto it.

Within the field of space, use of rigid light shields is only possible in cases where a light shield is of small dimensions and in particular is of short length. In effect, when the dimensions of the light shield increase, these dimensions quickly become incompatible with the volume restrictions imposed during the launch. Hence, a rigid light shield of great length integral with an optical instrument cannot always by positioned in the reduced volume available under the nose cone of a launch vehicle.

For this reason, certain optical instruments put on board space vehicles have been equipped with retractable light shields. Such light shields have a retracted or folded configuration when they are placed under the nose cone of the launch vehicle. They are generally clamped by devices called "stacking" devices which allow them to bear the accelerations and the vibrations of the launch. When the space vehicle is separated from the launch vehicle, command devices allow the light shield to be brought into an active or deployed configuration.

In the present state of the technology, the retractable light shields which are fitted to optical instruments put on board space vehicles include mechanisms which can be relatively complicated, for example mechanisms of the pantograph or telescopic type. When one takes into account the particular constraint due to the space environment (lubrication in a vacuum, the mechanical loading during the launch, etc.) such mechanisms can be very expensive, notably for reasons of reliability.

DESCRIPTION OF THE INVENTION

The precise subject of the invention is a retractable device of the light shield type, whose particularly simple design and production allow it to be appreciably more economic and more reliable than existing retractable devices.

Conforming to the invention, this result is obtained by means of a retractable device, capable of hindering the entry of parasitic light through an opening of a given axis in an optical instrument, characterised by the fact that it comprises rods articulated about the optical instrument within planes containing said axis or parallel to it, a flexible and opaque covering carried by said rods and command means capable of causing the rods to pivot between a retracted configuration in which the covering is positioned around the optical instrument and an active configuration in which the covering extends beyond said opening.

In a preferred embodiment of the invention, the rods comprise first rods to which the covering is fixed and second rods mounted between the first rods and co-operating with the covering to hold it radially outwards between the rods, in the active configuration.

In a more precise fashion, in the active configuration, the first rods are directed approximately parallel to the axis of the optical instrument and the second rods deviate progressively from this axis beyond the opening of the optical instrument.

Depending on the case, a single second rod or at least two second rods are mounted between two consecutive first rods.

So as to hold the covering radially outwards between the first rods, in the active configuration, the second rods are preferably supported on a surface of the covering capable of being turned towards the axis of the optical instrument in this same active configuration.

When the device of the light shield type must have a symmetrical shape, the rods are spaced regularly about its axis and are approximately of the same length.

An asymmetrical device can however be obtained by giving the rods different lengths.

According to a first embodiment of the invention, in the retracted configuration the rods are situated in a plane perpendicular to the axis of the optical instrument.

According to a second embodiment of the invention, in the retracted configuration, the rods are directed approximately parallel to the axis of the optical instrument, around this axis short of the opening.

According to a third embodiment of the invention, in the retracted configuration, the rods deviate progressively from the axis of the optical instrument, around this axis, short of the opening.

Preferably each of the rods is formed from a single rigid section.

As a variant, each of the rods can also be formed from at least two rigid sections articulated end to end, in such a way that they fold one onto the other in the retracted position and in such a way as to be arranged in extension one from the other in the active configuration.

BRIEF DESCRIPTION OF THE DRAWINGS

Different embodiments of the invention will now be described, by way of non-limitative examples, making reference to the appended drawings, in which.

DETAILED DESCRIPTION OF SEVERAL PREFERRED EMBODIMENTS OF THE INVENTION

Figure 1:
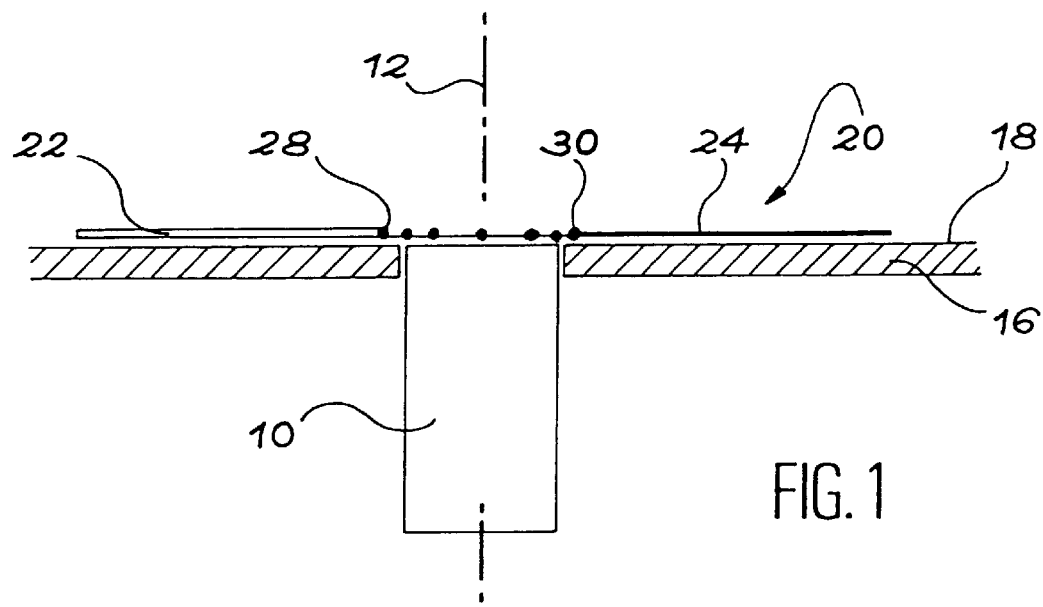
FIG. 1 is a side view, in partial section along the line I—I of FIG. 2, which diagrammatically represents a part of a space vehicle that includes an optical instrument fitted with a retractable device in accordance with a first embodiment of the invention, this device being shown in the retracted configuration.

First of all, a first embodiment of the invention will be described making reference to FIGS. 1 to 4.

In these Figures, an optical instrument such as a telescope on board a space vehicle has been represented diagrammatically by 10. To make it easier to understand, this optical instrument 10 is shown in the form of a tube of given diameter and length. This tube contains the optical elements (not represented) necessary for its operation.

The optical instrument 10 is centred on an optical axis 12. At one of its ends, turned towards the top in FIGS. 1, 3 and 4, it has an opening for observation of circular shape and centred on the optical axis 12. This opening is designated by reference number 14 in FIG. 2.

The optical instrument 10 is loaded on board a space vehicle, only part of whose structure adjoining this instrument is shown in the Figures. In the first embodiment of the invention illustrated in FIGS. 1 to 4, this structural part includes a side wall 16 an external surface 18 of which, substantially flat, is directed perpendicular to the optical axis 12 and is situated substantially in the plane of the opening 14.

Conforming to the invention, a retractable device 20, of the light shield type, designed to hinder the entry of parasitic light through opening 14, is connected to the optical instrument 10. This device can be in a retracted configuration (FIGS. 1 and 2) or in an active configuration (FIGS. 3 and 4).

Figure 2:
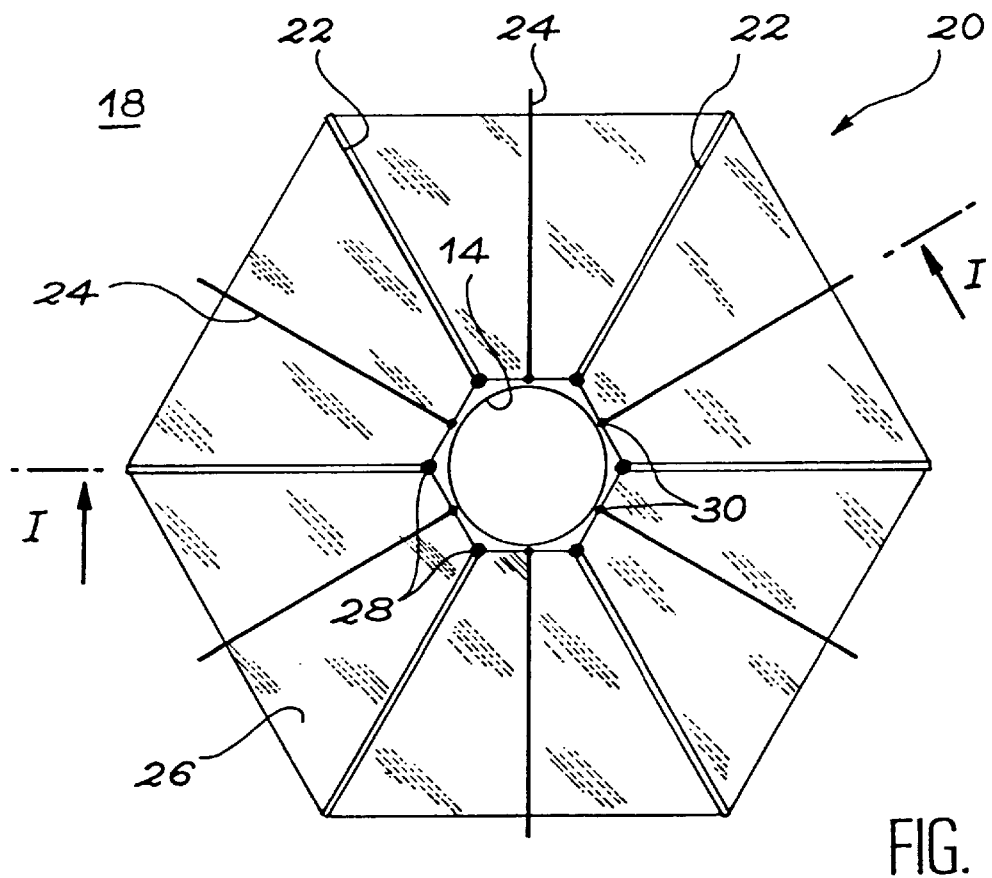
FIG. 2 is a view from above of the vehicle in FIG. 1.

In the first embodiment of the invention, the retracted configuration, illustrated in FIGS. 1 and 2, is such that the device 20 is applied against the flat external surface 18 of the side wall 16.

Figure 3:
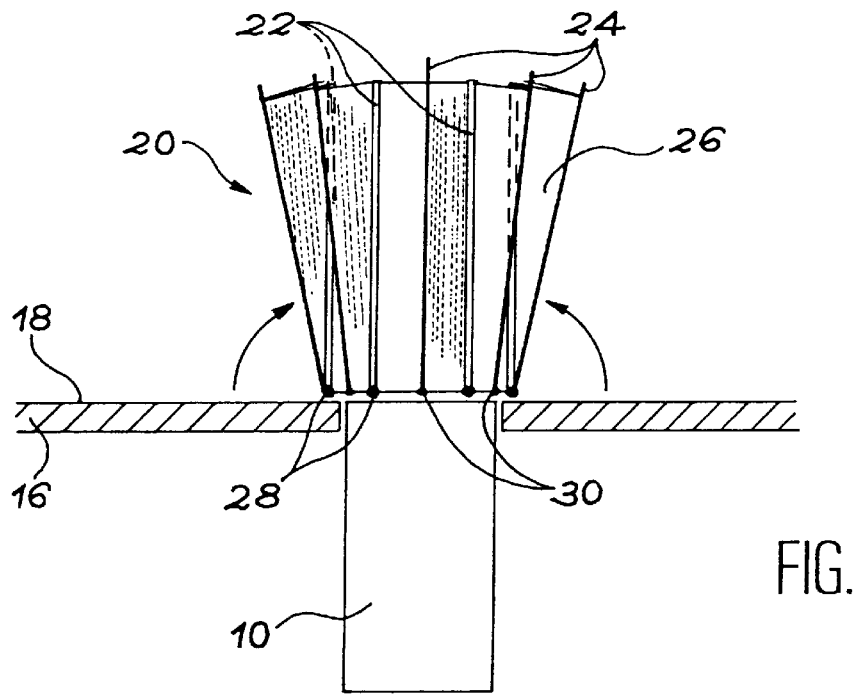
FIG. 3 is a view, comparable to FIG. 1, in which the retractable device is represented diagrammatically in the active configuration.
Figure 4:
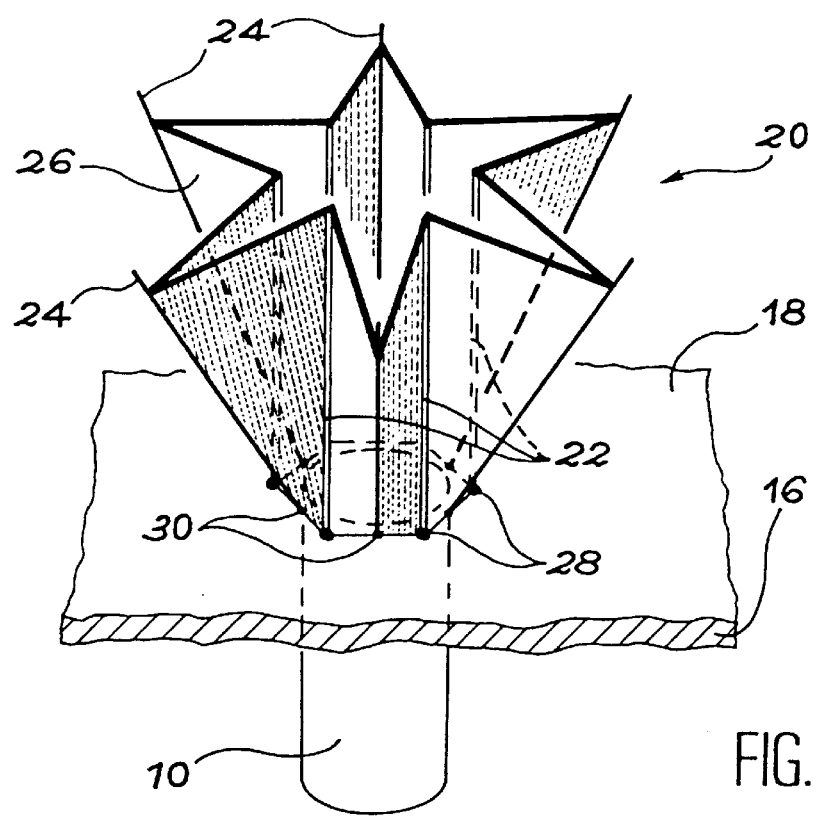
FIG. 4 is a perspective view showing the retractable device in the active configuration.

In the active configuration, illustrated in FIGS. 3 and 4, the device 20 is positioned in an extension of the optical instrument 10, at the side of its opening 14, around the field of vision of the optical instrument.

As is shown, notably in FIG. 2, the retractable device 20 conforming to the invention comprises first rods 22, second rods 24, and a flexible and opaque covering 26 carried by these rods. Each of the rods 22 and 24 is formed from a single rigid section, articulated on the structure of the space vehicle, around the optical instrument 10. More precisely, each rod 22, 24 is articulated in such a way as to be able to pivot in a plane that contains the optical axis 12. The articulation devices for the rods 22 are designated by reference number 28 and the articulation devices for the rods 24 are designated by reference number 30 in the Figures.

All of the articulation devices 28 and 30 are situated approximately on a circle centred on the optical axis 12 and perpendicular to this axis. In the first embodiment of the invention illustrated in FIGS. 1 to 4, this circle is situated approximately in the same plane as that of the opening 14 of the optical instrument 10.

The first rods 22 are regularly distributed around the optical axis 12 and the covering 26 is fixed onto these rods by any appropriate means (stitched, glued, riveted, bolted etc.). Furthermore, all the rods 22 are of the same length.

In the embodiment illustrated by way of example in FIGS. 1 to 4, the number of second rods 24 is the same as the number of first rods 22 and this number is equal to six. Each of the second rods 24 is then positioned between two consecutive first rods 22.

Furthermore, each of the second rods 24 pivots about its articulation device 30 within the bissecting plane of the planes within which the two adjacent first arms 22 pivot. The second rods 24 all have the same length and this length is approximately equal to that of the first rods 22, as FIG. 2 shows. The device 20 is therefore symmetrical about the optical axis 12.

In this embodiment, the second rods 24 are not connected to the covering 26. However, they are normally supported against the surface of this covering 26 which is arranged to be turned towards the optical axis 12 when the device 20 is in its active configuration illustrated in FIGS. 3 and 4. The second rods 24 then have the function of holding the covering 26 radially outwards between the first rods 22, in the active configuration illustrated in FIGS. 3 and 4. They then avoid any danger of partially obscuring the field of view of the optical instrument 10 with the covering 26.

As a variant, the second rods 24 may however be fixed, at least partially, to the covering 26, without departing from the scope of the invention. In this case, the second rods 24 can be positioned either on one side or the other of the covering 26.

The retractable device 20 conforming to the invention, comprises, in addition, command means (not shown) integrated into each of the articulation devices 28 and 30 by which the rods 22 and 24 are connected to the structure of the satellite. These command means have the function of causing the device 20 to pass from its retracted configuration illustrated in FIGS. 1 and 2 into its active configuration illustrated in FIGS. 3 and 4 when they are operated.

In the retracted configuration illustrated in FIGS. 1 and 2, all the rods 22 and 24 are held against the external flat surface 18 of the side wall 16. They are therefore situated in a plane perpendicular to the optical axis 12 and are directed radially with respect to this axis. Under these conditions the covering 26 is stretched.

In the active configuration illustrated in FIGS. 3 and 4, the first rods 22 are directed substantially parallel to the optical axis 12, beyond the opening 14 formed in the optical instrument 10. On the other hand, the second rods 24 deviate progressively from the axis 12, beyond the opening 14, so as to keep the covering 26 relatively stretched and away from the field of view of the optical instrument 10, as is shown diagrammatically in FIG. 4.

In practice, the command means which are connected to the articulation devices 28 and 30, to cause the device to pass from its retracted configuration of FIGS. 1 and 2, into its active configuration of FIGS. 3 and 4, can be constituted by any known means that allow this operation to be accomplished.

A first solution consists of using torsion springs positioned on the axes of each of the articulation devices 28 and 30, abutments then limiting the pivoting of the rods 22 and 24 to the desired pivot angles. In this case, clamping systems usually called "stacking systems" are used to keep the device 20 in its retracted configuration.

The command means can also use alloys with shape memory or any other simple motor device that allows the desired operation to be accomplished.

In the first embodiment of the invention illustrated in FIGS. 1 to 4, the command means housed in the articulation devices 28 of the first rods 22 provide pivoting of 90° of these first rods, while the command means housed in the articulation devices 30 of the second rods 24 provided pivoting of the second rods appreciably less than 90°.

In its planar configuration illustrated in FIG. 2, the covering 26 has approximately the shape of a disc. This disc has a central opening adjacent the articulation devices 28 and 30. The edge of this central opening, of circular or polygonal shape, is in contact with the surface 18, in such a way as to ring the opening without light being able to pass through. The external peripheral edge of the disc formed by the covering 26 can be polygonal, as FIG. 2 illustrates, or circular or of another shape.

In the retracted configuration illustrated in FIGS. 1 and 2, the covering 26 is positioned totally around the optical instrument 10 and presses against the side wall 16 of the satellite. The volume occupied by the device 20 is therefore much reduced and does not impede the installation of the satellite under the nose cone of a launch vehicle.

In the active configuration illustrated in FIGS. 2 and 3, the covering 26 extends the optical instrument 10 beyond its opening 14. It thus prevents any entry of parasitic solar light through the opening 14. The light shielding function is thereby provided.

The rods 22 and 24 and the covering 26 are produced in any material having the desired mechanical and optical characteristics that can be used in the space industry.

Hence, the rods 22 and 24 can be metal rods (titanium, SiC, etc.) or can be made of a composite material.

In a comparable way, the covering 26 can be produced in any flexible material that is opaque in the wavelength range of the optical instrument being considered. It may notably be made of fabric painted black or gilded on the inside.

Figure 5:
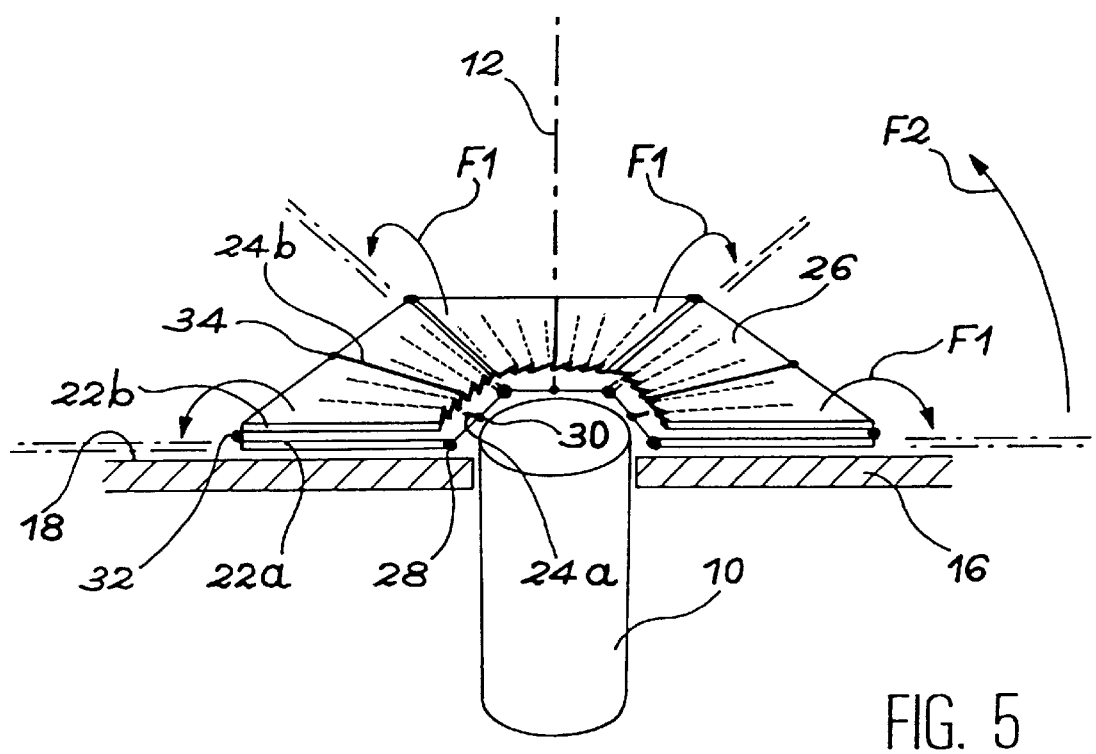
FIG. 5 is a perspective view, comparable with FIG. 4, illustrating a variant of the first embodiment of the retractable device, in the retracted configuration, in the case where each rod of the device is formed from two rigid articulated sections.

In FIG. 5 a variant of the first embodiment of the invention is shown.

This variant differs essentially from the embodiment previously described in that instead of being formed from a single rigid section, each of the rods 22 and 24 is made up of two rigid sections articulated end to end. These sections are designated by reference numbers 22a and 22b for the first rods 22 and by reference numbers 24a and 24b for the second rods 24. The two sections of each of the rods 22 and 24 are approximately of the same length.

Each of the first sections 22a of the first rods 22 is then articulated on the structure of the satellite by one of the articulation devices 28, while the second section 22b of this first rod 22 is articulated at the opposite end of the first section 22a, by another articulation device 32.

In a comparable fashion, one end of the first section 24a of each of the second rods 24 is articulated on the structure of the satellite by one of the articulation devices 30, while the second section 24b of this second rod is articulated at the opposite end of the first section 24a by an articulation device 34.

The articulation devices 32 and 34 are created such that the sections 22b and 24b fold back respectively onto sections 22a and 24a when the latter are applied against the external surface 18 of the side wall 16, in the retracted configuration illustrated in FIG. 5. The part of the covering 26 joined to the second sections 22b and 24b then forms folds, as FIG. 5 illustrates.

In this case, command means, preferably identical to those which are fitted to articulation devices 28 and 30 are integrated into articulation devices 32 and 34.

When one wishes to pass the device from its retracted configuration illustrated in FIG. 5 into its active configuration, the command means integrated into the articulation devices 32 and 34 are used. The second sections 22b and 24b of rods 22 and 24 then pivot outwards in the planes which contain them passing through the optical axis 12. This pivoting is illustrated diagrammatically by the arrows F1 in FIG. 5. When this has been done, the second sections 22b of rods 22 form an extension of the first sections 22a of these rods. Similarly, the second sections 24b of rods 24 are positioned forming a continuation of the first sections 24a of these rods.

The device then has a configuration analogous to that of the device according to the first embodiment described in retracted configuration. Use of the command means integrated into the articulation devices 28 and 30 permits it to pass into the active configuration as is illustrated diagrammatically by the arrow F2 in FIG. 5.

The layout that has just been described with reference to FIG. 5 can be generalised for rods 22 and 24 formed from more than two rigid sections articulated end to end. However the number of sections must remain reasonable so as not to excessively complicate the mechanism.

This embodiment variation allows one to increase the length of the light shield device, the volume occupied in the retracted configuration remaining practically unchanged.

Figure 6:
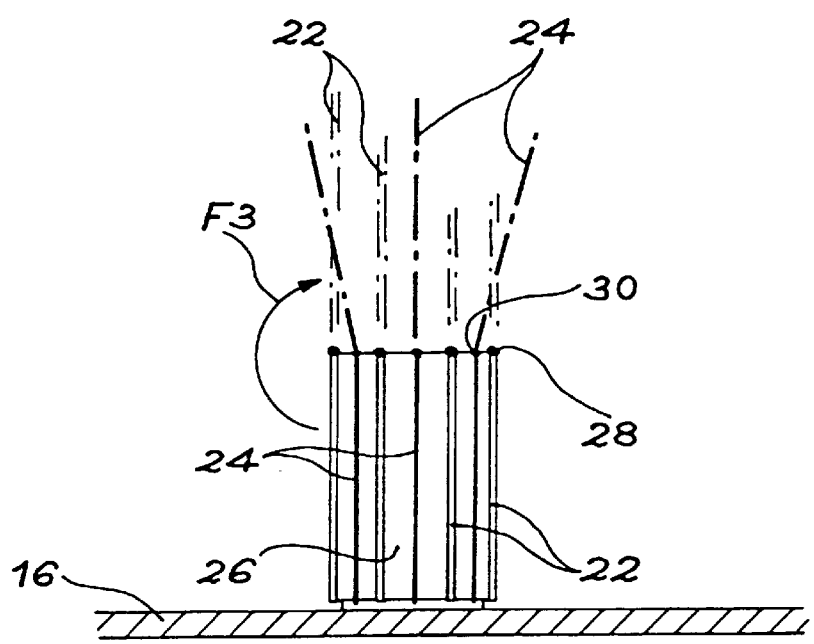
FIG. 6 is a view comparable with FIG. 1, illustrating a second embodiment of the retractable device according to the invention, illustrated with unbroken lines in the retracted configuration and with broken lines in the active configuration.

Now a second embodiment of the invention will be described making reference to FIG. 6.

This second embodiment differs essentially from the first in the retracted configuration of the device and in the pivoting angle of the rods at the time the command means are used. The structure of the device 20 is otherwise unchanged so it will not be described again.

In this second embodiment, the side wall 16 is done away with or is positioned at the other end of the optical instrument 10. The device 20 can then be folded against the approximately cylindrical external surface of the optical instrument 10 as illustrated using unbroken lines in FIG. 6. In the retracted configuration thereby obtained, the rods 22 and 24 are directed substantially parallel to the optical axis 12 and are situated short of the opening 14 and of their articulation devices 28 and 30.

The active configuration of the device is in other respects the same as that in the first embodiment. Consequently, using the command means, illustrated diagrammatically by the arrow F3 in FIG. 6, is accompanied by the first rods pivoting 180° about their articulation devices 28 and by the second rods 24 pivoting less than 180° about their articulation devices 30.

Figure 7:
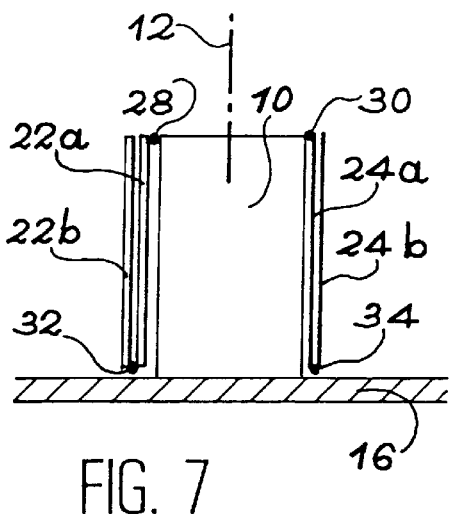
FIG. 7 is a diagrammatic view comparable with FIG. 6, representing a variant of the second embodiment of the retractable device according to the invention, in its retracted configuration, when each of the rods of the device is formed in two articulated sections.
Figure 8:
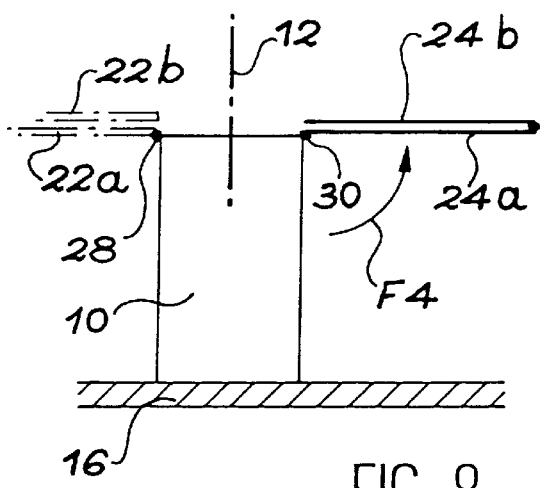
FIG. 8 is a view comparable with FIG. 7 illustrating a first stage of deployment of the retractable device illustrated in FIG. 7.
Figure 9:
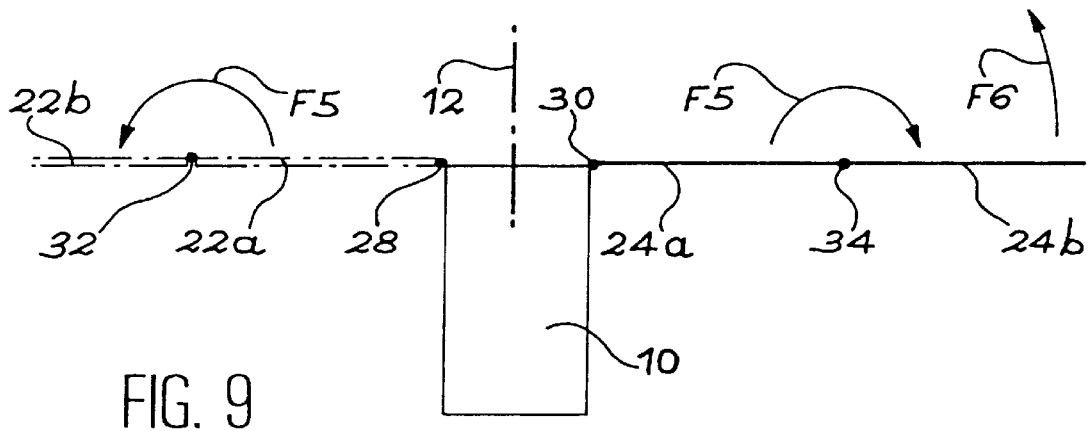
FIG. 9 is a view comparable with FIGS. 7 and 8, illustrating a second stage of deployment of the retractable device illustrated in these Figures.

In FIGS. 7 to 9, a variant of the second embodiment of the invention is shown. This variant is similar to the variant in FIG. 5 since it relates to the case where, instead of being produced in the form of a single rigid section, each of the rods 22 and 24 is formed in two rigid sections articulated end to end.

In the retracted configuration illustrated in FIG. 7, the first sections 22a, 24a of each of the rods 22 and 24 are folded onto the external cylindrical surface of the optical instrument 10, about articulation devices 28, 30 and the second sections 22b, 24b of each of the rods are folded onto the first sections about articulation devices 32 and 34.

Passage of the device from its retracted configuration illustrated in FIG. 7 into its active configuration is carried out in three stages illustrated diagrammatically in FIGS. 8 and 9.

During a first stage, illustrated in FIG. 8 by the arrow F4, the two sections 22a, 22b and 24a, 24b of each of the rods 22 and 24 pivot outwards approximately 90° about respective articulation devices 28 and 30. The device is then approximately in the plane of the opening of the optical instrument 10, that is to say in a configuration analogous to that in FIG. 5.

The second stage consists of the second sections 22b and 24b of the rods 22 and 24 pivoting 180° about articulation devices 32 and 34 as the arrows F5 in FIG. 9 illustrate. This movement is analogous to that which is designated by the arrows F1 in FIG. 5.

Finally, the rods 22 and 24 pivot again through approximately 90° about their articulation devices 28 and 30, as shown by the arrow F6 in FIG. 9. This movement comparable to that which is designated by the arrow F2 in FIG. 5, allows the covering to be brought into active configuration, approximately in a continuation of the optical instrument 10, beyond its opening.

In this embodiment variation shown in FIGS. 7 to 9, the different pivoting movements designated by arrows F4 to F6 are controlled by command means connected to the different articulation devices, as has been previously described.

Figure 10:
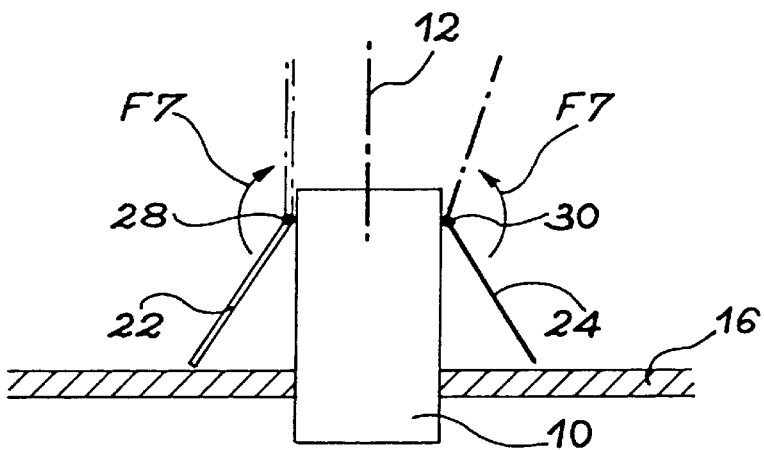
FIG. 10 is a view comparable with FIGS. 1 and 6, illustrating a third embodiment of the retractable device according to the invention.

In FIG. 10, a third embodiment of the invention has been represented diagrammatically. This embodiment differs essentially from the embodiments previously described in the retracted configuration of the device.

In this retracted configuration, the rods 22 and 24 deviate progressively from the optical axis 12, starting from their articulation devices 28 and 30, while remaining positioned around the optical instrument 10 and short of the opening formed in it.

As has been illustrated diagrammatically in FIG. 10, this embodiment corresponds to the case where the side wall is set back with respect to the opening formed in the optical instrument over a distance insufficient for the rods 22 and 24 to be able to be totally folded onto the external peripheral surface of the optical instrument. The free ends of the rods 22 and 24 are then in abutment against the side wall 16 and give the device a substantially truncated conical shape in its retracted configuration illustrated in unbroken lines.

The articulation devices 28 and 30 are not necessarily positioned in the plane of the opening of the optical instrument 10. Hence, in FIG. 10, these articulation devices are situated slightly set back with respect to this opening.

The active configuration of the device being the same as that in the embodiments previously described, the pivoting angle that allows the first rods 22 to pass from the retracted configuration into the active configuration is an angle intermediate between 90° and 180° as the arrows F7 illustrate in FIG. 10.

In all the embodiments described up to now, the device is symmetrical about the optical axis 12. In particular, the rods 22 and 24 are all of the same length and they are regularly distributed over the whole circumference about the optical axis 12.

In certain cases, the parasitic incident light from which one wishes to protect the optical instrument may be emitted along a lateral direction that is invariable with respect to this instrument. The use of a device having asymmetric geometry in its active configuration can then be envisaged, notably so as to limit the weight and the volume occupied by the device to what is strictly necessary.

Figure 11:
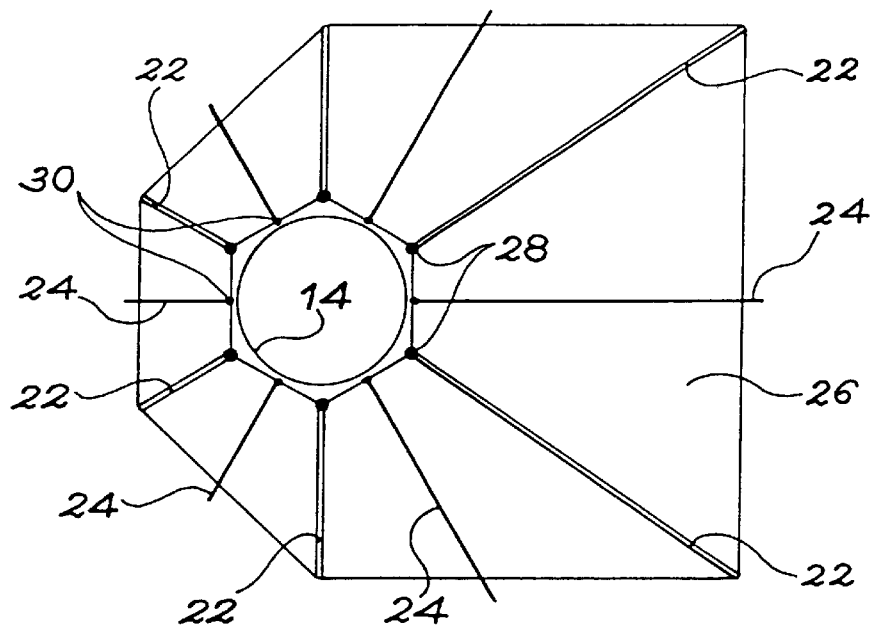
FIG. 11 is a view from above, comparable with FIG. 2, illustrating another variant of the invention.
Figure 12:
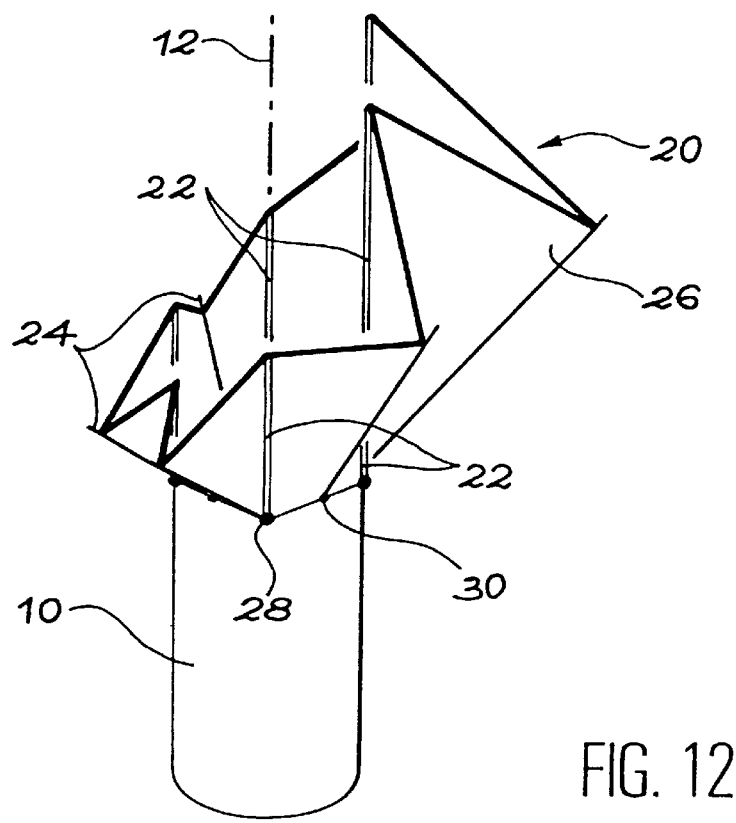
FIG. 12 is a perspective view illustrating the retractable device of FIG. 11 in the active configuration.

FIGS. 11 and 12 illustrate diagrammatically a variant of the first embodiment of the invention, applied to such an asymmetrical device. As these Figures show, the rods 22 and 24 then have a greater length on one side of the optical instrument 10 than on the other. The dimensions of the covering 26 change over the circumference of the device in proportions comparable to those of the lengths of the rods 22 and 24.

As a consequence, when the device is in its active configuration illustrated in FIG. 12, it extends the optical instrument 10 beyond its opening 14 over a length that is appreciably greater on one side than on the other. By taking care to effect a suitable orientation of the optical instrument with respect to the source of the parasitic light, which is supposedly situated to the right in the case shown in FIG. 12, the desired result is achieved.

In all the embodiments described up to now, a single second rod 24 is positioned between two consecutive first rods 22. However this arrangement is not essential and it may be easily understood that two or more second rods can be positioned between two first consecutive rods without departing from the scope of the invention.

Furthermore, the embodiment variation with the asymmetric character in FIGS. 11 and 12 described for the case of the embodiment in FIG. 1, can be applied without any difficulty to other embodiments that have been described, as well as their variants in which each of the rods 22 and 24 is formed from several articulated sections.

In addition, instead of including the axis 12, the planes in which the rods 22 and 24 move can be parallel to this axis while not including it, without departing from the scope of the invention.

Finally, it should be noted that the retractable device according to the invention can be used whatever the nature of the parasitic light source (sun or artificial light) and on any type of optical instrument whatever its field of use may be (in space or terrestrial).

What is claimed is:

1. A retractable device for hindering the entry of parasitic light through an opening in an optical instrument having a longitudinal optical axis, said device comprising:

rods articulated to move in planes that include said optical axis;

a flexible and opaque covering carried by said rods; and command devices configured to pivot the rods between a retracted configuration in which the covering is positioned around the optical instrument and an active configuration in which the covering extends beyond said opening, wherein the rods in said retracted position are positioned at an angle of at least about 90 degree from the optical axis.

2. A device according to claim 1, wherein said rods comprise first rods fixed to the covering and second rods mounted between the first rods and configured to hold the covering radially outwards between the first and second rods, in the active configuration.

3. A device according to claim 2 in which, in the active configuration, the first rods are directed substantially parallel to said optical axis and the second rods deviate progressively from said axis beyond the opening.

4. A device according to claim 1 in which a single second rod is mounted between two consecutive first rods.

5. A device according to claim 1 in which at least two second rods are mounted between two consecutive first rods.

6. A device according to claim 2 in which the second rods supported on one surface of the covering capable of being turned towards said optical axis, in said active configuration.

7. A device according to claim 1 in which the rods are regularly distributed around said optical axis and are approximately of the same length.

8. A device according to claim 1 in which the rods have different lengths.

9. A device according to claim 1 in which, in the retracted configuration, the rods are situated in a plane perpendicular to said optical axis.

10. A device according to claim 1, wherein in the retracted configuration, the rods are positioned at about 180 degree from said optical axis around the optical instrument, short of the opening.

11. A device according to claim 1 in which in the retracted configuration, the rods deviate progressively from said optical axis around the optical instrument, short of the opening.

12. A device according to claim 1 in which each of the rods is formed from a single rigid section.

13. A device according to claim 1 in which each of the rods is formed from at least two rigid sections articulated end to end, in such a way as to be folded one upon the other in the retracted configuration and in such a way as to be arranged in extension, one to the other, in the active configurations.

* * * * *